United States Patent
Chilamakuri et al.

(10) Patent No.: US 11,321,198 B2
(45) Date of Patent: May 3, 2022

(54) EVENT FAILOVER SERVICE

(71) Applicant: SAP SE, Walldorf (DE)

(72) Inventors: Sateesh Babu Chilamakuri, Tirupati (IN); Ramya Nandakumaran, Chennai (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/935,071

(22) Filed: Jul. 21, 2020

(65) Prior Publication Data

US 2022/0027215 A1   Jan. 27, 2022

(51) Int. Cl.
| | |
|---|---|
| *G06F 11/00* | (2006.01) |
| *G06F 11/20* | (2006.01) |
| *G06F 9/54* | (2006.01) |
| *G06F 11/30* | (2006.01) |
| *G06F 11/07* | (2006.01) |

(52) U.S. Cl.
CPC .......... *G06F 11/2023* (2013.01); *G06F 9/542* (2013.01); *G06F 11/0709* (2013.01); *G06F 11/302* (2013.01); *G06F 11/3055* (2013.01); *G06F 2201/86* (2013.01)

(58) Field of Classification Search
CPC .............. G06F 11/302; G06F 11/3055; G06F 11/0709; G06F 11/202; G06F 11/2023; G06F 11/2025; G06F 11/203; G06F 11/3006; G06F 2201/86; G06F 9/542
See application file for complete search history.

(56) References Cited

U.S. PATENT DOCUMENTS

| | | | | |
|---|---|---|---|---|
| 2005/0229183 A1* | 10/2005 | Araujo | .................... | G06F 13/24 719/310 |
| 2008/0052556 A1* | 2/2008 | Donovan | ............ | G06F 11/2028 714/4.11 |
| 2013/0007505 A1* | 1/2013 | Spear | .................. | G06F 11/2025 714/4.11 |

OTHER PUBLICATIONS

Event Based Scheduling, https://answers.sap.com/questions/7836609/event-based-scheduling.html, Oct. 28, 2010, 3 pages.
How event-driven responses are triggered in SAP Business Workflow, https://www.techrepublic.com/article/how-event-driven-responses-are-triggered-in-sap-business-workflow/, Apr. 18, 2003, 8 pages.
Verma, "Introduction to SAP Event Management," http://saptechnical.com/Tutorials/Others/SEM/Index.htm, at least as early as Jul. 21, 2020, 4 pages.
Bo Files, bofiles—chadmart (google.com), at least as early as Jul. 21, 2020, 1 page.

(Continued)

*Primary Examiner* — Joseph D Manoskey
(74) *Attorney, Agent, or Firm* — Klarquist Sparkman, LLP

(57) ABSTRACT

Techniques and solutions are described for detecting event server failure and taking one or more actions in response to such detection. A plurality of events are registered with a first event server. If it is determined that the first event server is not operational, a notification can be provided, such as to a user through an administrator console. At least a portion of the events can be sent to a second event server for processing. In some cases, events that are sent to the second event server for processing can have summary records updated to remap or re-register the events with the second event server. In other cases, the events sent to the second event server do not have their summary records remapped or registered with the second event server.

20 Claims, 9 Drawing Sheets

LOGICAL DATA OBJECT SCHEMA 100

(56) References Cited

OTHER PUBLICATIONS

Interface Hierarchy, https://help.sap.com/doc/javadocs_bip_42/4.2/en-US/bip/en/com/crystaldecisions/sdk/plugin/desktop/event/package-tree.html, at least as early as Jul. 21, 2020, 2 pages.
Interface IFile Event, https://help.sap.com/doc/javadocs_bip_40/4.0/en-US/bip/en/com/crystaldecisions/sdk/plugin/desktop/event/IFileEvent.html, at least as early as Jul. 21, 2020, 2 pages.
BO SDK—Get List of File Events into Excel, https://everydaybo.wordpress.com/tag/business-objects/, at least as early as Jul. 21, 2020, 10 pages.
Interface IEventServerAdmin, https://help.sap.com/doc/javadocs_bip_40/4.0/en-US/bip/en/com/crystaldecisions/sdk/plugin/admin/eventserveradmin/IEventServerAdmin.html, at least as early as Jul. 21, 2020, 3 pages.
Class CeProperty ID, https://help.sap.com/doc/7adfc93c56564bb0bade737ea8a3a61f/4.2.4/en-US/com/crystaldecisions/sdk/occa/infostore/CePropertyID.html, at least as early as Jul. 21, 2020, 67 pages.
Interface IInfoObject, https://help.sap.com/doc/javadocs_bip_41/4.1/en-US/bip/en/com/crystaldecisions/sdk/occa/infostore/IInfoObject.html, at least as early as Jul. 21, 2020, 24 pages.
Index, https://help.sap.com/doc/7adfc93c56564bb0bade737ea8a3a61f/4.2.4/en-US/index-all.html, at least as early as Jul. 21, 2020, 236 pages.
Including Event Data Changes in Process Chains, https://help.sap.com/doc/saphelp_nw70/7.0.31/en-US/ec/0d0e405c538f5ce10000000a155106/content.htm?no_cache=true, at least as early as Jul. 21, 2020, 3 pages.
Central Management Server (CMS), https://help.sap.com/viewer/336fc7bf4e3646d29439f2048f1b244e/4.2.11/en-US/573e3e6e6d6d1014b3fc9283b0e91070.html, at least as early as Jul. 21, 2020, 2 pages.
Nakoti, "Automate scheduling using File event," https://blogs.sap.com/2015/03/03/automate-scheduling-using-file-event/, Mar. 3, 2015, 15 pages.
Triggering a custom event, https://help.sap.com/viewer/2710d05c6f7f452baddb4ca72b72fdc2/4.2.5/en-US/eca2a41d6fdb101497906a7cb0e91070.html, at least as early as Jul. 21, 2020, 2 pages.
Creating Event-Driven Schedules with Events, https://help.sap.com/viewer/6f5031836c4b1014a504d193c6d75675/7.01.22/en-US/d40494a36b7946a8abd8bae642c2b86c.html, at least as early as Jul. 21, 2020, 5 pages.
Event Handling Framework, https://help.sap.com/saphelp_sfin200/helpdata/en/77/79cb55065c3105e10000000a44538d/content.htm?no_cache=true, at least as early as Jul. 21, 2020, 2 pages.
Check File Event, https://help.sap.com/viewer/59d4f223cf834ea49e1bd22a01c1bf14/7.0.32/en-US/9ced8ae06e6c10148ebe1a87b0e91070.html, at least as early as Jul. 21, 2020, 2 pages.
File event in pending-raised status, https://answers.sap.com/questions/6526941/file-event-in-pending-raised-status.html, Sep. 20, 2009, 3 pages.
CMC\Events in Business Objects and it's Usage, https://blogs.sap.com/2013/01/07/cmcevents-in-business-objects-and-its-usage/, Jan. 7, 2013, 21 pages.
Query the BusinessObjects repository using REST SDK (RWS), https://blogs.sap.com/2017/05/10/query-the-businessobjects-repository-using-bi-platform-rest-sdk-rws/, May 10, 2017, 12 pages.
BOBJ sdk—Constant value for SI_KIND, https://answers.sap.com/questions/9683029/bobj-sdk---constant-value-for-sikind.html, Nov. 27, 2012, 7 pages.
InfoObject, https://help.sap.com/doc/saphelp_nw70/7.0.31/en-US/23/054e3ce0f9fe3fe10000000a114084/content.htm?no_cache=true, at least as early as Jul. 21, 2020, 3 pages.
InfoProviders, https://help.sap.com/doc/saphelp_nw70/7.0.31/en-US/4d/c3cd3a9ac2cc6ce10000000a114084/content.htm?no_cache=true, at least as early as Jul. 21, 2020, 2 pages.
Difference between Info Object and Data Store Object in BI, https://answers.sap.com/questions/9220263/difference-between-info-object-and-data-store-obje.html, Apr. 11, 2012, 3 pages.
Scheduling object packages, https://help.sap.com/viewer/cb15050fa506430e96213902217fed79/4.2.3/en-US/46ac7fed6e041014910aba7db0e91070.html, at least as early as Jul. 21, 2020, 3 pages.
Schedule Business Objects Reports Using BI Launchpad, https://blogs.sap.com/2014/09/11/schedule-business-objects-reports-using-bi-launchpad/, Sep. 11, 2014, 13 pages.
Business Objects 4.0, https://www.youtube.com/watch?v=tApmWXa6UG4, at least as early as Jul. 21, 2020, 3 pages.
Demo on building workflow using custom business object, events and methods, https://www2.slideshare.net/rfaccini/244399924-demoonbuildingworkflowusingcustombusinessobjecteventsandmethods, Aug. 7, 2009, 18 pages.
Custom event creation by using change document concept, https://blogs.sap.com/2013/07/16/custom-event-creation-by-using-change-document-concept/, Jul. 16, 2013, 8 pages.
SAP BO Events and scheduled based on events, http://techbusinessintelligence.blogspot.com/2013/12/sap-bo-events-and-schedule-based-on.html, at least as early as Jul. 21, 2020, 2 pages.
Let's learn SAP-Business Objects, bo-reports.blogspot.com/2016/10/scheduling-based-on-events-in-cmc.html, Oct. 23, 2016, 10 pages.
File Event Based Scheduling, https://answers.sap.com/questions/7293495/file-event-based-scheduling.html, May 4, 2010, 4 pages.
Event Based Reporting—Concept for best utilizing the BO events, https://blogs.sap.com/2014/08/12/ebr/, Aug. 12, 2014, 6 pages.
Events and alerting, https://help.sap.com/viewer/0225aa3e7b4b4b17b2d4a882e6f2de96/4.2.4/en-US/45a29be16e041014910aba7db0e91070.html, at least as early as Jul. 21, 2020, 2 pages.
To trigger a custom event, https://help.sap.com/viewer/0225aa3e7b4b4b17b2d4a882e6f2de96/4.2.4/en-US/45a2cbbb6e041014910aba7db0e91070.html, at least as early as Jul. 21, 2020, 2 pages.
Events and Scheduling, https://help.sap.com/viewer/2710d05c6f7f452baddb4ca72b72fdc2/4.2.5/en-US/46f385b76e041014910aba7db0e91070.html, at least as early as Jul. 21, 2020, 6 pages.
SAP ABAP—Object Events, https://www.tutorialspoint.com/sap_abap/sap_abap_object_events.htm, at least as early as Jul. 21, 2020, 1 page.
SAP ABAP—Events, https://web.archive.org/web/20171119154056/https://www.tutorialscampus.com/tutorials/sap-abap/sap-abap-events.htm, at least as early as Jul. 21, 2020, 5 pages.

* cited by examiner

EVENT FAILOVER SERVICE

FIELD

The present disclosure generally relates to computer-implemented handling of events that can be detected by a computer. Particular implementations transfer events that are associated with a failed event server to a different event server that remains operational.

BACKGROUND

Many types of software programs are implemented in a manner where a program waits for a particular event to occur. A program may wait for a specific event to occur and then take a specific action, or the program can wait for a greater variety of events to occur, and can different actions depending on the specific event that occurred, or specific details for a specific event occurrence. That is, a program may take a specific action for a specific event, or the details of the event can result in different actions being taken by the program.

A specific program or program component can be designed to detect events and to trigger associated actions, which actions can include notifying other software programs or processes that the event has occurred. In some cases, a schedule can be created that is triggered by the occurrence of an event. Once the event has occurred, scheduled actions can be executed, where these actions can themselves be events that trigger yet additional actions. However, issues can arise if a software program or process that is programmed to detect events and trigger actions fails. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for detecting event server failure and taking one or more actions in response to such detection. A plurality of events are registered with a first event server. If it is determined that the first event server is not operational, a notification can be provided, such as to a user through an administrator console. At least a portion of the events can be sent to a second event server for processing. In some cases, events that are sent to the second event server for processing can have summary records updated to remap or re-register the events with the second event server. In other cases, the events sent to the second event server do not have their summary records remapped or registered with the second event server.

In one aspect, the present disclosure provides a technique for processing events registered with a first event server with a second event server. It is determined (such as by an event failover service) that a first event server is not available to process a plurality of events registered for processing by the first event server. It is determined that a second event server is operational for the computing system and is available to process at least a first portion of the plurality of events registered for processing by the first event sever. The at least a first portion of the plurality of events are send to the second event server to be processed by the second event server.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
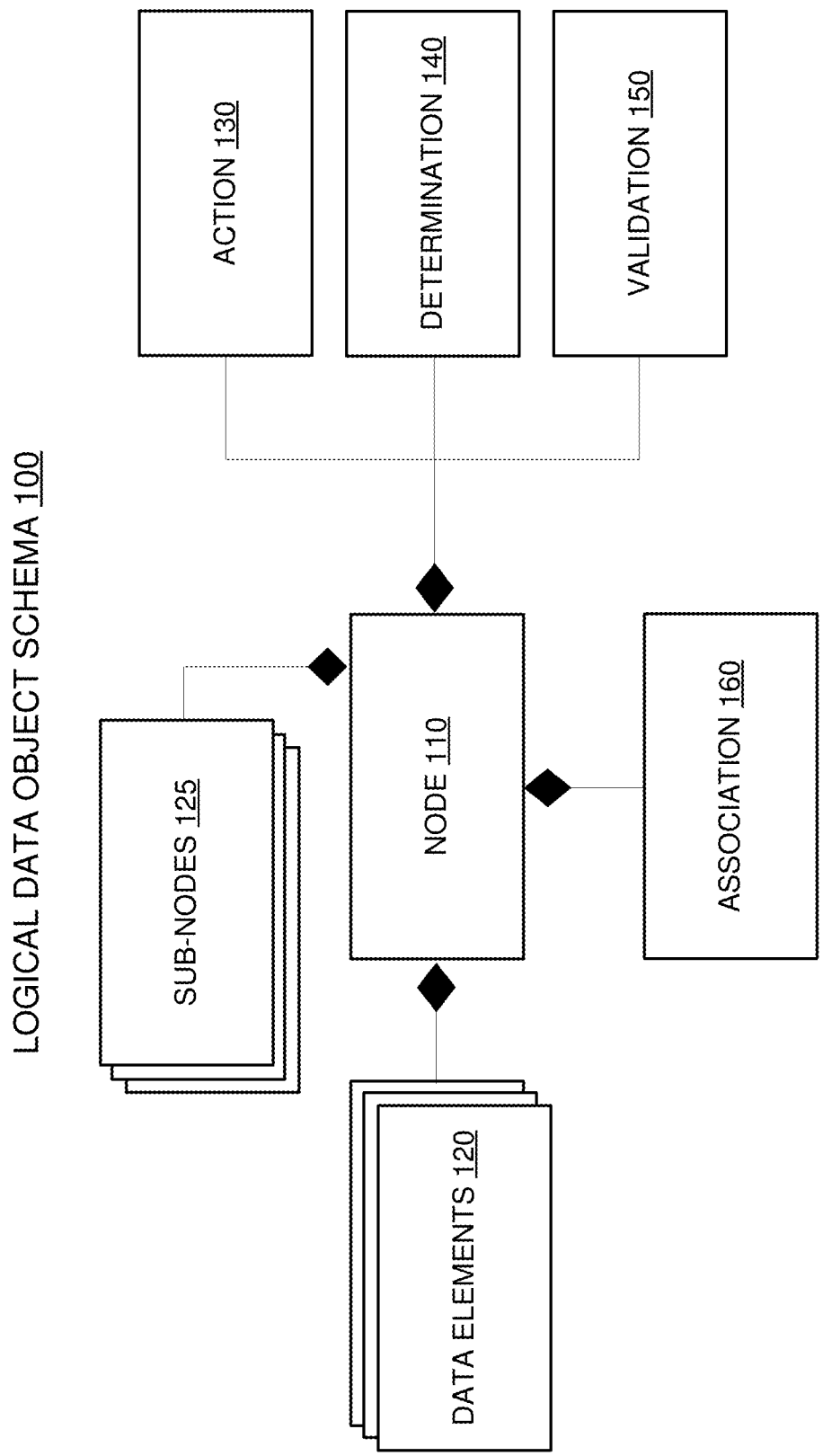
FIG. 1 is a block diagram depicting a schema for a logical data object.

Many types of software programs are implemented in a manner where a program waits for a particular event to occur. A program may wait for a specific event to occur and then take a specific action, or the program can wait for a greater variety of events to occur, and can take different actions depending on the specific event that occurred, or specific details for a specific event occurrence. That is, a program may take specific action for a specific event, or the details of the event can result in different actions being taken by the program.

A specific program or program component can be designed to detect events and to trigger associated actions, which actions can include notifying other software programs or processes that the event has occurred. In some cases, a schedule can be created that is triggered by the occurrence of an event. Once the event has occurred, scheduled actions can be executed, where these actions can themselves be events that trigger yet additional actions. However, issues can arise if a software program or process that is programmed to detect events and trigger actions fails. Accordingly, room for improvement exists.

As an example of how events can be detected and used to trigger actions, software available from SAP SE, of Walldorf, Germany, such as SAP BW, SAP BI, or SAP BUSI- NESS OBJECTS, includes a central management server that receives notifications from one or more event servers. Events can be created and registered with an event server. When an event server detects the occurs of an event, the event server can notify the central management server. Schedules can be registered with the central management server, and can be associated with one or more events. These events can include triggering events that cause at least certain actions in the schedule to be carried out. These events can also be events that are defined based on the execution of all or a portion of actions in a schedule, which can thus trigger the execution of additional schedules. In this way, various processes (defined by the schedules) can be chained together using events.

In some systems, if an event server fails, events associated with that event server may not be processed. That is, if the event server fails, it is not able to notify the central management sever that the event server has failed. If the event is unable to be executed (e.g., a data object representing an event, such as an instance of an abstract or composite data type that represents an event), the event may be designated as having failed, including by changing a value for a data member for the data object that represents the event status. However, in at least some systems, an administrator may not be notified of the failure, which can delay remedial actions. This delay can result in longer periods of time before actions associated with a failed event are triggered, or the failure of additional events since the administrator may not realize that the event server has failed.

Some software programs, including those available from SAP SE, allow for multiple event servers to be instantiated. When a new event is defined, such as by a user, the event can be associated with a selected event server of multiple event servers, such as by a user assigning the event to an event server during an event configuration process. However, event servers are typically independent, in that an active event server is not used to process events that were associated with an event server that failed.

The present disclosure provides technologies that can address at least some of the issues noted above. An event failover service monitors the status of one or more event servers. When an event server fails, the event failover service can take actions, the nature of which actions can depend on configuration of the service and the availability of one or more active event servers.

When a single event server is present, or if an event server or the event failover service is not configured to use additional event servers, at least for certain types of events, the event failover service can cause a notification to be sent, such as to an administrator, that the event server has failed. In response to the notification, corrective action, such as restarting the failed event server or reprocessing failed events, can be carried out.

Similar actions can be taken when a computing system is configured with multiple event servers as when the computing system includes a single event sever. However, additional actions can be taken for events of a failed event server when at least one active event server is available. In one implementation, events that were registered with the failed event server can be remapped to an active event server. Remapping can cause failed events to be processed, and can prevent future failures of the events (so long as the event server to which the events are remapped remains active). If desired, events that are remapped to a different event server can be mapped back to the original event server, or mapped to yet a different event server. Such remapping (or mapping) can be performed by an administrator or automatically by a software process, including using defined rules (which rules in turn may be defined by administrator).

In another implementation, events that were registered to the failed event server can remain registered to the failed event server, but can be temporality processed by an active event server. In some cases, a software object representing an event can be passed to an active event server for processing, such as using an interface (e.g., an application program interface) for the active event server. The process of passing failed events, including for the same event which may have failed multiple times, can continue until the event server to which the event is registered comes back online, or criteria for taking other action is met. Such other criteria can include a threshold number of event failures (of a single event or as an aggregate value for multiple different events) occurring, at which time events for the failed event server can be remapped to one or more active event servers, which can occur at least generally as described above.

The present disclosure can thus provide advantages for processing of events. By providing alerts when an event sever fails, disclosed technologies can allow a failed server to be more quickly restarted, which can limit a number of failed events and which can allow failed events to be more quickly processed. By having failed events processed by an active sever, failed events may still be processed, or processed more quickly, than in situations where corrective action is only taken after a failed event server was restarted. Thus, processes triggered by events can be carried out with less interruption or delay.

Example 2—Example Logical Data Objects

As will be further described, software used in various aspects of disclosed technologies can use software objects. A software object generally refers to a collection of software components such as variables, methods, data structures, or other software objects. A software object is associated with a particular type, which has a particular definition (which definition can specify different options for a software object, such that multiple instances of an object can have different properties). Instances of the software object can be instantiated based on the definition of the software object. Examples of software objects include composite data types and abstract data types, such as instances of classes. Software objects can be represented in a programming language, but can also be represented in other formats, including markup languages or data representations (or data interchange formats) such as JSON (JAVACRIPT OBJECT NOTATION), CSN (common schema notation), XML, or HTML. Software objects can also be logical data objects, such as BUSINESSOBJECTS, as implemented in software available from SAP SE, of Walldorf, Germany.

In any of the Examples described herein, a logical data object can be a specific example of an object in an object-oriented programming approach. However, unless the context specifically indicates otherwise, aspects of the present disclosure described with respect to logical data objects can be applied to other types of objects, or other types of data collections. For example, in addition to the software objects discussed above, a database table, or a group of related tables, can have fields that are analogous to data members of an object. Functions that correspond to member functions of an object can be defined to perform operations on the tables.

A logical data object can contain a definition of a hierarchical data structure and definitions of one or more operations that can be performed using portions of the hierarchical data structure. In some cases, a logical data object may be referred to as a "business object" and can take any number of forms including business intelligence or performance management components such as those implemented in software technologies of SAP BusinessObjects, ORACLE Hyperion, IBM Cognos, and others. However, the use of logical data objects in computer applications is not limited to "business" scenarios. Logical data objects can be used to define a particular application and/or problem domain space. Aspects and artifacts of a given problem domain can be defined using the hierarchical data structure and various portions of these aspects and/or artifacts can be associated directly with definitions of relevant logical operations. A logical data object can be an artefact of a virtual data model, or can be constructed with reference to artefacts of a virtual data model. In turn, components of the virtual data model can be mapped to another data model, such as a physical data model of a relational database system.

FIG. 1 is a diagram of an example logical data object schema 100. A node 110 can contain one or more data elements 120 (i.e., variables, such as data members). A data element 120 can contain an identifier, such as a name, and an associated value. The identifier can, for example, be associated with a field of a particular database table. In at least some embodiments, the data element 120 can be associated with a data type that restricts and/or validates the type of data that can be stored as a value of the data element 120.

The node 110 can contain one or more child nodes 125 (also referred to as sub-nodes), which can themselves contain additional data elements 120 (and other node components, including sub-nodes 125). Combinations of sub-nodes 125 can be used to define a hierarchical data structure of multiple nodes 110. In at least some embodiments, the hierarchical data structure can contain a root node that does not have a parent-node and can be used as an entry point for traversing the hierarchical data structure.

Each node 110 in the logical data object can be associated with one or more actions 130. An action 130 can comprise a definition for a logical operation that can be performed using the node 110 with which it is associated. The action 130 can contain an identifier that can be used to invoke the action's logical operation. Each node 110 in the logical data object can be associated with one or more determinations 140. A determination 140 can contain a definition for a logical operation that can be automatically executed when a trigger condition is fulfilled. Example trigger conditions can include a modification of the associated node 110, a modification of the data element 120 of the associated node, the creation of a data element 120 of the associated node, etc. A logical operation defined by an action 130, or a determination 140, can comprise instructions to create, update, read, and/or delete one or more data elements 120 and/or one or more sub-nodes 125. Actions 130 or determinations 140 can be set to trigger, in some cases, upon the occurrence of a particular date (e.g., a particular date or a particular time on a particular date).

Each node 110 in the logical data object schema 100 can be associated with one or more validations 150. A validation 150 can contain a definition of one or more data integrity rules and/or checks. The one or more data integrity rules and/or checks can be performed when the associated node 110, and/or one or more data elements 120 of the associated node, are created, modified, and/or deleted. Any such operation that does not satisfy the one or more data integrity rules and/or checks can be rejected.

Each node 110 in the logical data object schema 100 can be associated with one or more nodes from one or more other logical data objects (having the same schema or a different schema) by one or more associations 160. An association 160 can contain an identifier for a node in another logical data object that is associated with the node 110. Associations 160 can be used to define relationships among nodes in various logical data objects. The association 160, in at least some embodiments, contains an association type indicator that identifies a type of association between the node 110 and the node in the other logical data object.

Although the action 130 as defined and associated with the node 110, when the action 130 is invoked, it targets an identified instance of the node 110 with which it is associated. Similarly, a determination 140 and/or validation 150 can be defined and associated with a node 110, but can target an instance of the associated node 110 when it/they is/are invoked. Multiple instances of a given logical data object can be created and accessed independently of one another. Actions 130, determinations 140, or validations 150 may correspond to member functions of a data object, such as implemented in a C++ class.

Although the instances of the logical data object share a common schema 100, the data values stored in their respective node instances and data element instances can differ, as can the logical data object instances that are associated by the associations 160. Additionally, or alternatively, an instance of an association 160 can identify a particular instance of an associated node in another logical data object instance. The identifier of a node instance can be an alphanumeric string that uniquely identifies the instance and, in at least some cases, can be used to look the instance up and/or retrieve data associated with the instance. Particular examples of identifiers include numerical values and universally unique identifiers. However, other types of identifiers are also possible.

Various actions may be performed using logical data objects including create, update, delete, read, and query operations. If the requested operation is a read operation, the data payload may contain a unique identifier associated with a logical data object instance to be retrieved. Processing a read operation request can comprise searching for an instance of the logical data object that is associated with the provided unique identifier in a data store, and retrieving all or part of a matching logical data object instance's data from the data store. If the requested operation is an update operation, the data payload may contain one or more values to be assigned to data element instances of an existing logical data object instance. The data payload may also contain a unique identifier associated with the logical data object instance to be updated. Processing an update operation request can comprise searching for a logical data object instance in a data store associated with the provided unique identifier and updating the matching logical data object instance with the provided data values.

Example 3—Example Computing Environment with Event Failover Service

Figure 2:
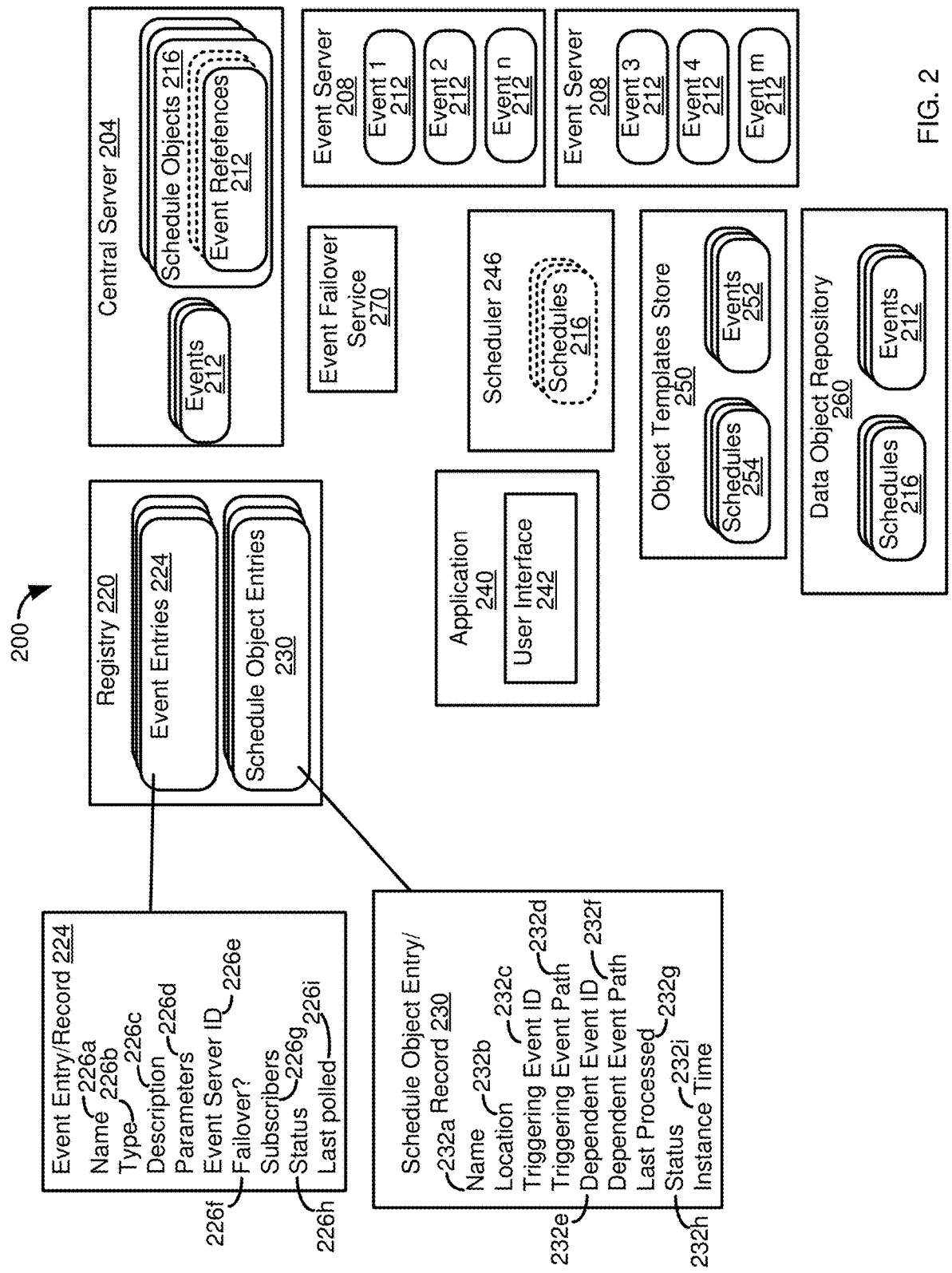
FIG. 2 is a diagram of an example computing environment, having an event failover service, in which disclosed technologies can be implemented.

FIG. 2 is a block diagram of an example computing environment 200 in which disclosed technologies can be implemented. In a particular example, the computing environment 200 can represent the SAP BusinessObjects BI software available from SAP SE, of Walldorf, Germany. However, the computing environment 200 can be implemented in other manners.

The computing environment 200 includes a central server 204 and one or more event servers 208. The central server 204 can be responsible for managing operations of the computing environment 200, including registering events 212 with the events servers 208, registering schedule objects 216 (e.g., schedules, as used in software of SAP SE, of Walldorf, Germany) that are triggered by, or trigger, events, and triggering schedule objects when a trigger event associated with a given schedule object is detected by an event server as having occurred. That is, the schedule objects 216 can include one or more events 212. At least some of the schedule objects 216 include events 212 which serve as triggering events for other schedule objects. Some schedule objects 216 do not include triggering events 212. That is, some events 212 can be scheduled to run based on a time schedule (e.g., daily, weekly), which may not be monitored by an event server 208. In such cases, while a time-based schedule object may trigger execution of another schedule object, it is not an event that is handled by an event server 208. In other cases, a time-based schedule object can also be a triggering event 212 that is handled by an event server 208. When the event 212 associated with the schedule object 216 is determined to have occurred, the event server 208 can notify the central sever 204 so that the central server can trigger schedule objects 216 having that event as a triggering event.

The events 212 and schedule objects 216 can be instances of software objects. Information about these instances can be stored in a registry (or repository) 220. The registry 220 can be accessed by the central sever 204. In some cases, the event servers 208 can also access the registry 220, while in other cases the event servers are not able to access the registry 220. In a particular example, the registry 220 can be implemented as, or in, a database. For example, one or more tables in a database system may store information for the registry 220. Attributes of the tables can correspond to components, such as data members, of an event 212 or a schedule object 216. Individual records in the tables can store attribute values for particular instances of an event 212 or a schedule data object 216.

As shown, a registry entry 224 for an event 212 can include attributes 226 (shown as attributes 226a-226i, which can also be referred to as fields or columns) for an event name 226a, an event type 226b, an event description 226c, event parameters, 226d, an event server ID 226e, a failover indicator 226f, identifiers for one or more subscribers 226g for the event, an event status 226h, and a last polled attributed 226i. An event name 226a can be used to identify an event. In some cases, the event name 226a is unique to a given event 212. In other cases, multiple events 212 can have the same value for the event name attribute 226a. If the event name attribute 226a is not unique, typically the registry entry 224 will include another identifier (not shown) that allows an event 212 to be uniquely identified.

Events 212 may have different types, where the type is identified by a value for the event type attribute 226b. Event types, in some implementations, can relate to the nature of an activity that triggers the event 212. Examples of event types include file events (e.g., when a given file is added, modified, or deleted), schedule events (e.g., execution of operations associated with a schedule object 216 act to trigger an event), and custom events (e.g., events that can be manually triggered, including being manually triggered during a software process, such as "IF CONDITION==TRUE, TRIGGER CUSTOM_EVENT1, ELSE TRIGGER CUSTOM_EVENT2").

The description of an event 212 provided by a value of the event description attribute 226c is typically a textual description (e.g., a string value) that describes the nature of the event (e.g., "trigger on completion of schedule object A"). The value for the attribute 226c can be useful for those reviewing registry entries for events 212. The value for the attribute 226c can also be useful in locating registry entries 224 for particular events 212, such as for keyword searches or queries to find event records meeting particular criteria.

Values provided for the parameters attribute 226d can include values for various data members of the event 212, including those that relate to a specific event type of those that are general to all or multiple types of events. In the case of a file event, a value for the parameter attribute 226d can be a file name, and optionally a file path, for the relevant file. In some cases, particular types of file activities can be specified as triggering a file event (e.g., such as to indicate that the event occurs/is triggered when a file changes, not when a file is deleted, or vice versa). Similarly, for a schedule event, the value for the attribute 226d can include an identifier for a schedule object 216 and optionally a path (e.g., a URI) where the schedule object, or information about the schedule object, can be located.

An identifier for an event server 208 that is responsible for processing a given event 212 can be indicated by a value for the event server ID attribute 226e. A value for the attribute 226e is particularly useful in embodiments of disclosed technologies that include multiple event servers 208, and more particularly when an event 212 can be processed by a different event server than an event server to which it is registered, or if the event can be registered to different servers (e.g., changing the registration from a first event server to a second event server if the first event server fails).

A value (such as a Boolean value) for the failover indicator attribute 226f can indicate whether a given event 212 should be handled by a failover service, in some cases. In other cases, the value for the attribute 226f can indicate whether the failover service should attempt to process the event 212 with a different event server 208 than the event server to which the event is registered. For example, a value of "FALSE" for the attribute 226f can indicate that an alert should be provided to an administrator if the event 212 fails on its registered event server 208, but that the event should not be sent to another event server to be processed (where the event is sent to another event server if the value is TRUE).

One or more values for the subscribers attribute 226g can indicate what software components or objects should be notified when an event occurs. Subscribers can include schedule objects 216. A value for the attribute 226g can include one or both of a unique identifier for a subscriber (e.g., a name or subscriber ID) or a path (e.g., a URI) where the subscriber can be reached.

Values for a status attribute 226h can indicate a processing status of an event 212. Values can indicate whether a given event 212 is pending (e.g., is active and an event server 208 is listening to detect if the event occurs), is inactive, is complete, is in process, has occurred but is again pending, and similar status types. As will be further described, values for the attribute 226h can be used to identify events 212 that should be the subject of an alert, or marked for processing by, or remapping to, another event sever 208 if the event server to which the event was originally registered fails or is otherwise unable to process an event.

An attribute 226i can have values that indicate a date/time an event server 212 last checked for the occurrence of an event 212, or received information regarding the occurrence (or nonoccurrence) of an event. For example, in the case of file events 212, an event server 208 can periodically poll a location to determine if a specified file is present, or if the specified file has been modified (in which case a record 224 for an event 212 can include information, such as a created date or last modified date, that can allow the event server to determine if a modification may have occurred).

A registry entry 230 for a schedule object 216 can have a plurality of attributes (or fields or columns) 232 (shown as attributes 232a-232i). The attributes 232 include a name attribute 232a, a location attribute 232b, a triggering event identifier 232c, a triggering event path 232d, a dependent event identifier 232e, a dependent event path 232f, a "last processed" date attribute 232g, a status attribute 232h, and an instance time attribute 232i. A value for the name attribute 232a can play a similar role as the name attribute 226a of an event registry entry 224. That is, the value for the name attribute 232a can uniquely identify the schedule object 216 or can provide a description of the schedule object that can allow a user to identify the schedule object, and optionally provide an indication of the purpose of the schedule object 216. In the event the name attribute 232a is not constrained to unique values, a registry entry 230 can include an additional attribute 232 (not shown) that serves to uniquely identify a schedule object 216.

The location attribute 232b can indicate where the schedule object 216 associated with a given entry 230 can be located, such as providing a URI for the schedule object, or a program (or program interface) that can be used to access the schedule object.

As described above, a schedule object 216 can be triggered by an event 212, but can also serve as a triggering event, such as an event that can trigger other schedule objects. The triggering event ID attribute 232c can have a value that identifies a particular event 212 that triggers the schedule object. In some cases, the value for the attribute 232c can be a value of the name attribute 226a of an event registry entry 224. A value of the attribute 232d can indicate where the event 212 associated with the attribute 232c can be located, which can be a location in the registry 220 or another location (e.g., for a location of the event object 212, rather than a record 224 that includes summary or descriptive information for the event). In a similar manner, a value for the attribute 232e can identify an event 212 that should be triggered when the schedule object 216 is processed, and a location for the event can be indicated by a value for the attribute 232f.

In some cases, schedule objects 216 are executed a single time (e.g., upon the first occurrence of a triggering event 212), while in other cases a schedule object can be executed multiple times (e.g., each time a triggering event occurs), at least subject to other criteria or constraints (e.g., an end date, a threshold number of executions having been reached, the occurrence of another event, or satisfaction of other conditions). A date the schedule object 216 was last executed or processed can be indicated by a value for the "last processed" attribute 232g.

A value for the status attribute 232h can serve a similar function as the status attribute 226h of a registry entry 224 for an event 212. Values for the status attribute 232h can indicate whether the schedule object 216 is active, pending, failed, in process, inactive, or similar statuses. The status attribute 232h can be used to locate schedule objects 216 that may not have been triggered because of a failed event sever 208. These schedule objects 216 can be included in an alert to a user regarding a failed event server 208, or can be used to identify schedule objects 216 that should be processed in response to handling of an event 212 by an event server 208 other than an event sever to which the triggering event for the schedule object was registered.

In some cases, multiple instances of a schedule object 216 can be created. In such cases, it can be useful to provide an indicator of when the instance was created (e.g., instantiated). The instance time attribute 232i can represent when a particular schedule object 216 was instantiated.

It should be appreciated that event registry entries 224 and schedule object registry entities 230 can be configured in a different manner than shown. In particular, a registry entry 224 or a registry entry 230 can include more, fewer, or different attributes 226, 232 than shown in FIG. 2.

A user can create new events 212 and new schedule objects 216 through a user interface 242 of an application 240. The user interface 242 can also be used to display information regarding alerts associated with events 212 or schedule objects 216, such as notifications associated with the failure of an event server 208. In particular, schedule objects 216 can be defined, and scheduled, using a scheduler component 246. Issues regarding events 212, schedule objects 216, or the status of event servers 208 can be provided via the user interface 242, which can provide an administrator console.

Events 212 and schedule objects 216 can be associated with respective templates 252, 254 in an objects template store 250. The event templates 252 and the schedule object templates 254 can be, or can be analogous to, a definition of an abstract or composite data type, such as a class in C++ or JAVA. However, the objects template store 250 can include templates for other types of objects, including objects that are used in processing a schedule object 216, and which can be included in, or referenced by, a schedule object (or a template 254 therefore). Some objects in the object template store 250 can be defined with respect to data stored in a data store (not shown, but which may be a relational database, such as SAP HANA of SAP SE, of Walldorf, Germany), such as using object-relational mapping. The object template store 250 can be, can include, or can access a virtual data model (including the Core Data Services virtual data model of SAP, SE), where the virtual data model can reference a data model of the data store.

Instances of objects created from templates of the object templates store 250 can be stored in a data object repository 260. Thus, the data object repository 260 can store events 212 or schedule objects 216. In other implementations, instances of software objects are not stored in a data object repository 260, but rather can be stored in memory allocated for a runtime environment of an application that uses or manages the software objects, which can be the application 240 or an application other than the application 240.

The computing environment 200 includes an event failover service 270. The event failover service 270 can be responsible for taking various actions regarding events 212 or schedule objects 216 when an event server 208 fails, such as notifying a user of the failure or causing events to be processed by a different event server 208. As will be further described, in a particular implementation the event failover service 270 is in communication with the central server 204. The central server 204 can monitor the status of the events servers 208. In turn the event failover service 270 can request event server status information from the central server 204.

In taking actions to notify users of event server failures, or to process or otherwise handle events 212 associated with a failed event server 208, the event failover service 270 can communicate with other components of the computing architecture 200. For example, the event failover service 270 can communicate with the event servers 208, such as to send events 212 that were to be processed by an event sever that failed to an event server that remains operational. In some cases, the event failover service 270 can remap or reregister events 212 to different event servers 208, in which case the event failover service can communicate with the data object repository 260 to update attributes of events 212 or with the registry 220 to update entries 224 for events that are being remapped from one event server to another event server. The event failover service 270 can also communicate with the application 240, such as to send notifications to a user that an event sever 208 has failed that certain events 212 or schedule objects 216 have not been processed, that processing of one or more events is being handled by a different event server than an event server originally specified for the event, or that an event is being remapped to a new event server.

Example 4—Example Triggering of Schedule Objects by Events

Figure 3:
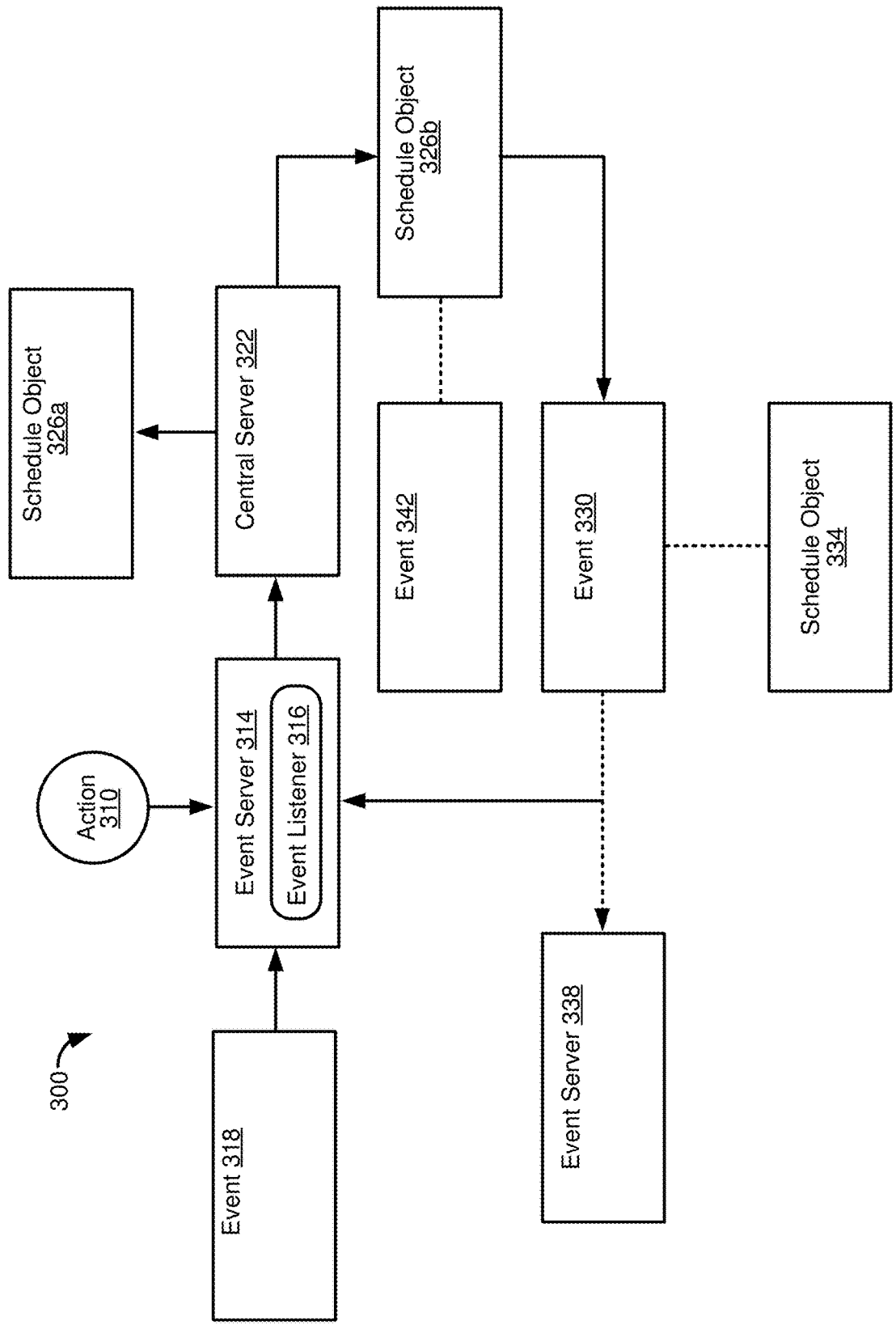
FIG. 3 is a diagram schematically illustrating how an event can be used to trigger the processing of one or more schedule objects, where a processed schedule object can itself serve as an event.

FIG. 3 schematically depicts a process 300 of processing an event. The process 300 can be carried out in the computing environment 200 of FIG. 2.

At 310, an action associated with an event/trigger is detected by an event server 314, which can be an event server 208 of FIG. 2. The event server 314 can implement an event listener 316 for an event 318 that has been registered with the event server. In some cases, the event listener 316 receives messages, such as from an application, a framework, or an operating system, that are associated with the event 318. For example, an operating system can provide messages regarding file creation, modification, or deletion that can serve as the action 310. Or, processing of a schedule object (e.g., a schedule object 216), such as by an application or framework, can serve as the action 310. In other cases, the listener 316 can be implemented as a more active component, or can be processed by such a component of the event server 316, such as a component that periodically examines a file location to determine whether a file is present or whether a file has been modified.

When the event server 314 detects that the event 318 has occurred, the event server can notify a central server 322 (which can be the central server 204 of FIG. 2, and which can more specifically be the Central Management Service as used in products available from SAP SE, of Walldorf, Germany) The central server 322 can determine one or more schedule objects for which the event 318 serves as a trigger. As shown, schedule objects 326*a*, 326*b* were identified by the central server 322 as being triggered by the event 318. The central server 322 can then trigger the schedule objects 326*a*, 326*b*, causing operations associated with or specified in the schedule objects to be carried out. In some cases, the central server 322 can communicate with another component, such as the scheduler 246, where such other component triggers the schedule objects 326*a*, 326*b*.

As previously explained, some schedule objects can serve as, or be associated with events. As shown, schedule object 326*a* does not serve as an event trigger. However, schedule object 326*b* is associated with an event 330 that in turn serves as a trigger for a schedule object 334. The event 330 can be associated with the event server 314, or another event server, such as event server 338.

Note that the schedule object 326*b* can be associated with other events, such as event 342. Event 342 can represent another event that will trigger the schedule object 326*b*. For example, event 318 can be a file event and event 338 can be a custom event.

Example 5—Example Event Registration Process

Figure 4:
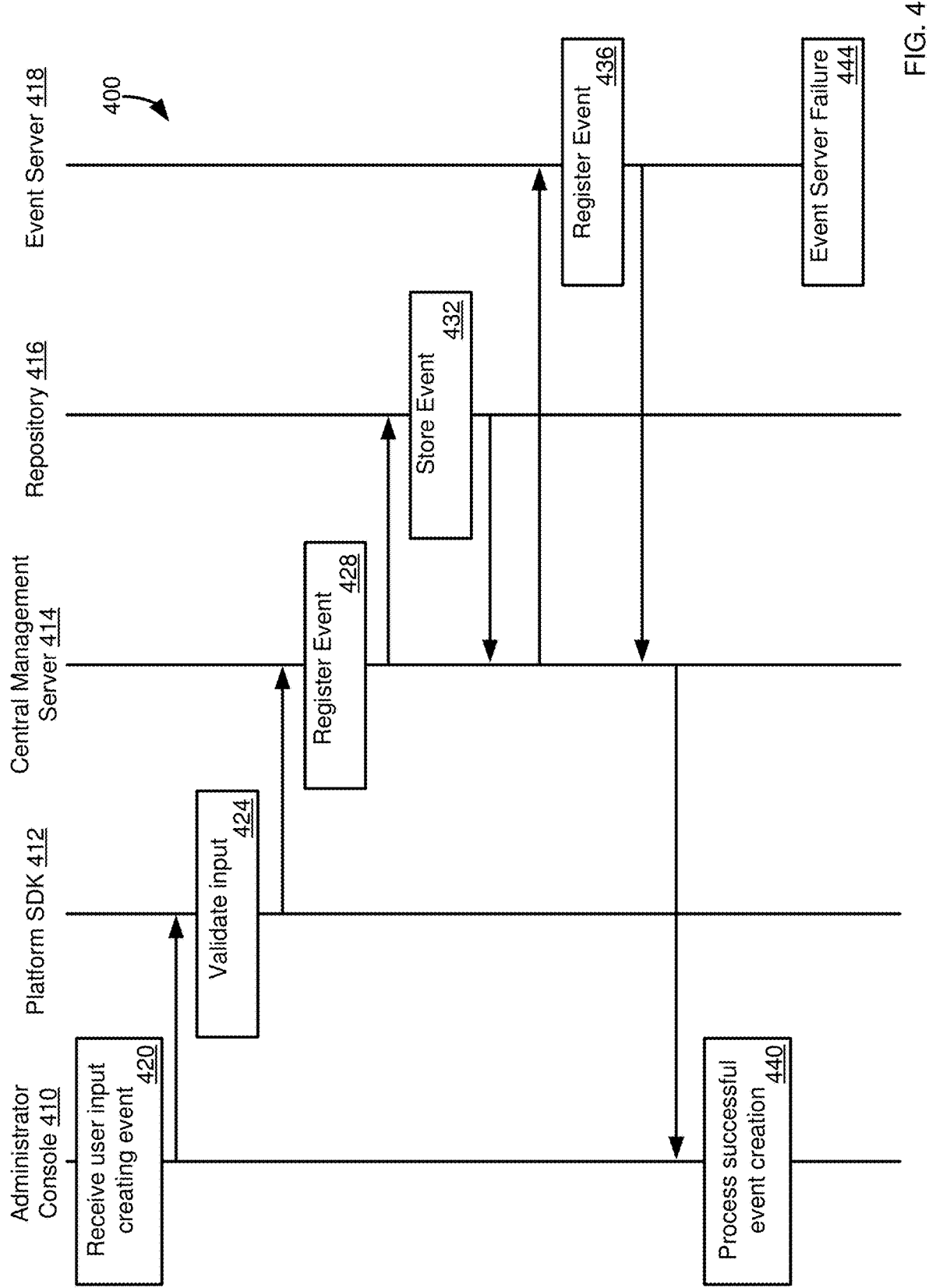
FIG. 4 is a diagram illustrating a process for registering an event with an event server.

FIG. 4 is a diagram of a process 400 for creating an event. The process 400 can be carried out in the computing environment 200 of FIG. 2, and the event can be an event 212. The process 400 is carried out in part using an administrator console 410, which can correspond to at least a portion of the application 240 and the user interface 242. Other components used in the process 400 include a software development kit 412, a central management server 414 (which can be the central server 204), a repository 416 (which can correspond to the registry 220), and an event server 418 (which can correspond to an event server 208). The software development kit 412 can be part of, depending on the implementation, the application 240, the central server 204, or another component of the computing environment 200.

At 420, user input is received through the administrator console 410 defining a new event (or, in some cases, modifying a previously created event). The user input 420 can include values for at least a portion of the attributes (or data members) of an event 212, which can in turn correspond to the attributes 226. At least a portion of values of the attributes can optionally be default values or values provided indirectly or implicitly based on the user input.

User input defining an event can be processed by the software development kit 412 at 424. The processing at 424 can including determining if the user input is valid, such as supplying a name that complies with naming rules, including, in some cases, being a unique name. If the processing at 424 is not successful, an error message can be returned (not shown) to the administrator console 410 to be displayed to the user. If the processing at 424 is successful, the user input, or an event instantiated using the user input (such as being instantiated by the software development kit 412 or a component, such as an object template repository, in communication with the software development kit) can be sent to the central management server 414.

At 428, the central management server 414 can register the event. As part of the registration, information regarding the event can be sent to the repository 416 to be stored at 432. For example, information regarding the event can be stored as attribute values in one or more tables representing an event (e.g., an event entry or record 224). The repository 416 can send a response to the central management server 414 indicating whether the storing at 432 was carried out successfully.

The central management server 414 can send the event (or information regarding the event) to the event server 418. The event is registered at the event server 418 at 436. Registering the event with the event server 418 can include instantiating a listener for the event, or otherwise initiating a process to determine whether the event has occurred. A message indicating whether the event was successfully registered at the event server 418 can be sent from the event server to the central management server 414. In turn, the central management server 414 can send a communication to the administrator console 410 that the event was successfully created. The administrator console 410 can provide an indicator of successful event creation to a user, or take other action triggered by successful event creation (e.g., transitioning to a different or modified user interface screen) at 440.

A failure of the event server 418 occurs at 444. In typical systems, no action is taken in response to event server failure. A notification of the event server failure is not sent to the administrator console, and action is not taken to process events registered with the event server 418.

Figure 5:
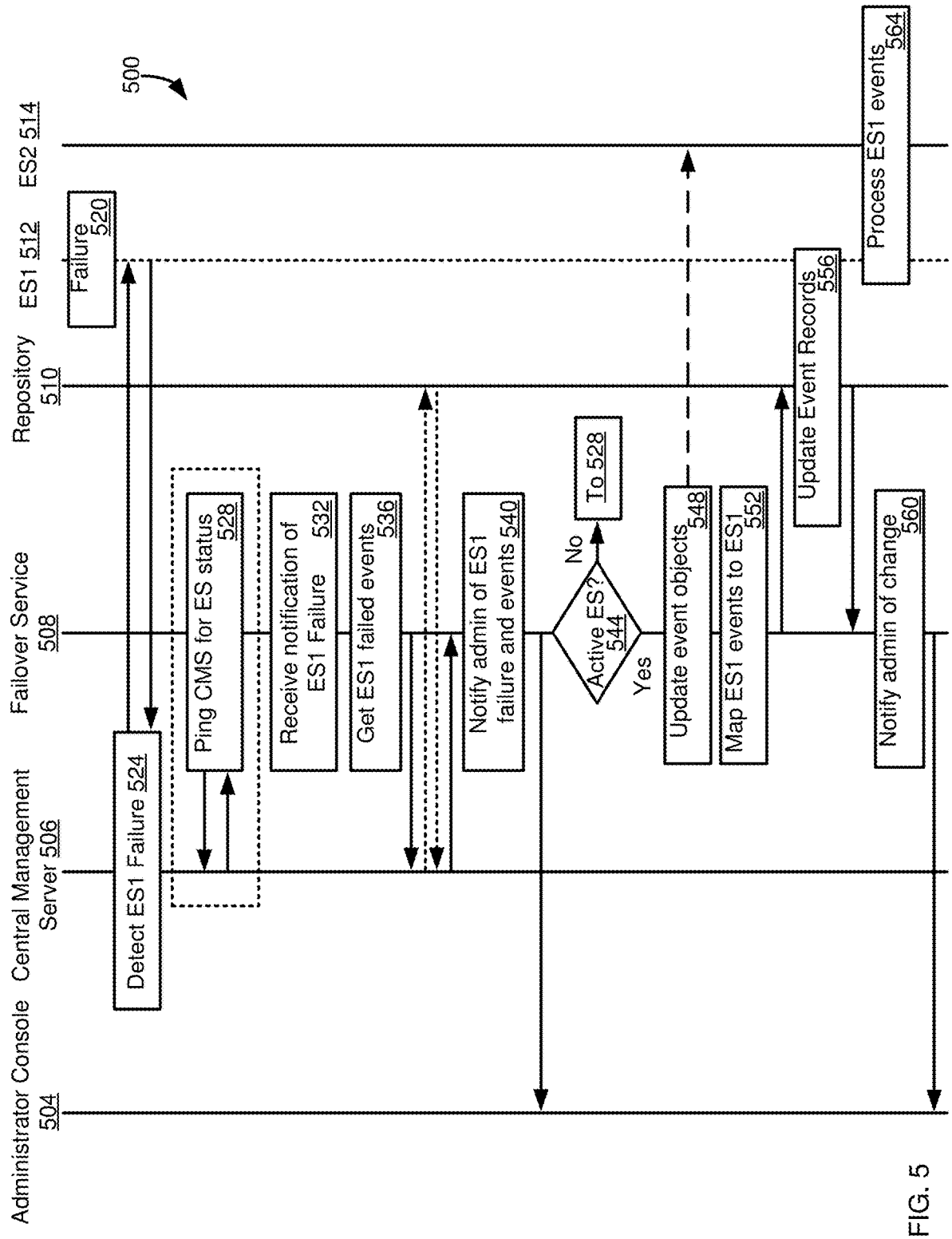
FIG. 5 is a diagram illustrating a process for processing events at a second event server that were registered for processing by a first event server, where registry records for the events are updated to indicate that they will be processed by the second event server.

Example 6—Example Process for Processing Events Registered with a First Event Server Using a Second Event Server, Including Remapping the Events FIG. 5 is a diagram of a process 500 for detecting and handling failure of an event server. The process 500 can be carried out in the computing environment 200 of FIG. 2, and the event can be an event 212. The process 500 can represent actions taken after the process 400 of FIG. 4 has been carried out for one or more events.

The process 500 is carried out in part using an administrator console 504, a central management server 506, a failover service 508, a repository 510, and first and second event servers 512, 514. The administrator console 504, the central management server 506, and the repository 510 can correspond to the similarly titled components 410, 414, 416 of FIG. 4. The event server 512 can correspond to the event server 418. The event server 514 can correspond to another event server 208 of the computing environment 200, while the failover service 508 can correspond to the failover service 270.

The first event server 512 fails at 520, which can correspond to 444 of the process 400. The central management server 506 can be configured to detect failure of the first event server 512 at 524. For example, if the central management server 506 does not receive communications from the first event server 512, which can be event-related communications or regularly sent status updates (e.g., a "stay alive" communication), the central management server 506 can determine that the first event server 512 may have failed, and can take actions assuming that the first event server has failed or can take actions to further confirm the status of the first event server (e.g., sending a status request). In other cases, the central management server 506 periodically queries the first event server 512 to confirm whether the first event server is active/optionally obtain operational status information for the first event server.

The failover service 508 periodically pings or polls the central management server 506 at 528 for status information regarding event servers in a computing environment serviced by the failover service. As shown, the failover service 508 requests status information for the first event server 512 and the second event server 514. At 532, the failover service 508 receives a notification (e.g., status information obtained during a communication 528) that the first event server 512 has failed. Note that the failover service 508 can be configured to determine that an event server 512, 514 has failed in another manner. For example, the failover service 508 can be configured to communicate directly with event servers, and thus may detect an event server failure in a similar manner as described for the central management server 506.

The failover service 508 can obtain failed events, or events that may not have been processed because of the failure of the first event server 512 at 536. As shown, the failover service 508 can request from the central management server 506 information regarding events, such as failed events, associated with the first event server 512. In some cases, in answering this request, the central management server 506 can query the repository 510 to identify events that should be provided to the event failover service (e.g., untriggered events or events that are recurring events). For example, the central management server 506 can issue a query such as "SELECT*FROM <event registry tables> WHERE ASSIGNED_EVENT_SERVER=FIRST_SERVER" or "SELECT*FROM <event registry tables> WHERE ASSISNGED_EVENT_SERVER=FIRST SERVER AND STATUS=PENDING OR STATUS=FAILED OR LAST_PROCESSED_TIME<<first event server failure time>>." In other implementations, the failover service 508 can directly query the repository 510, which queries can otherwise be similar to the queries described above that can be performed by the central management server 506.

In some implementations, including when the second event server 514 is not present or available, a notification of the failure of the first event server 512 can be sent to the administrator console 504 at 540, so that the administrator console can alert an administrator or other user so that appropriate action can be taken (e.g., the administrator can take action to restart or otherwise restore operation of the first event server). Optionally, the administrator console 504 can also be sent a list of events that may not have processed correctly. While notification of the administrator console 504 of a failed server or events associated therewith has been described as being performed by the failover service 508, the notification can be performed by, or in association with, another component, such as the central management server 506.

At 544, the failover service 508 can determine if another event server is available to process events that were to be processed by the first event server 512, which can include determining whether another event server (e.g., the second event server 514) is active, or determining whether events or a particular event server have been designated to be handled by the failover service. If another event server is not available, the process 500 can return to 528. If the administrator console 504 was already notified of the failure of the first event server 512, an additional notification need not be sent. However, if failed events are sent to the administrator console at 540, additional failed events, or events which otherwise remain to be processed, can be sent to the administrator console as they are determined during additional iterations of 536.

If it is determined at 544 that an additional event server (e.g., event server 514) is available to process events originally assigned to the first event server 512, the events (e.g., software objects representing an event) can be updated at 548. Updating an event can include updating a data member of the event to indicate that it is to be processed by the second event server 514 rather than the first event server 512. In some cases, at 548, the event objects can be passed to the second event server 514 for processing (e.g., in a call to an API or other functionality of the second event server). In other cases, rather than sending the event objects, new temporary event objects can be created (such as copying, at least in part, an event for a failed event server to a new event instance) and sent to the second event server 514. The temporary event objects can be deleted, such as when the first event server 512 regains operational status.

At 552, the failover service 508 can direct the repository to update relevant event records to indicate that they are now assigned to the second event server 514 rather than the first event server 512. If the failover service 508 is not able to directly access the repository 510, the failover service can request that another component, such as the central management server 506, request the update to be performed at the repository. The repository 510 can update the relevant event records at 556.

Optionally, at 560, the failover service 508 can notify (or cause a notification to be sent) to the administrator console 504 of events that have been transferred from the first event server 512 to the second event server 514 for processing. The second event server 514 can process the events remapped to it from the first event server 512 at 564.

Figure 6:
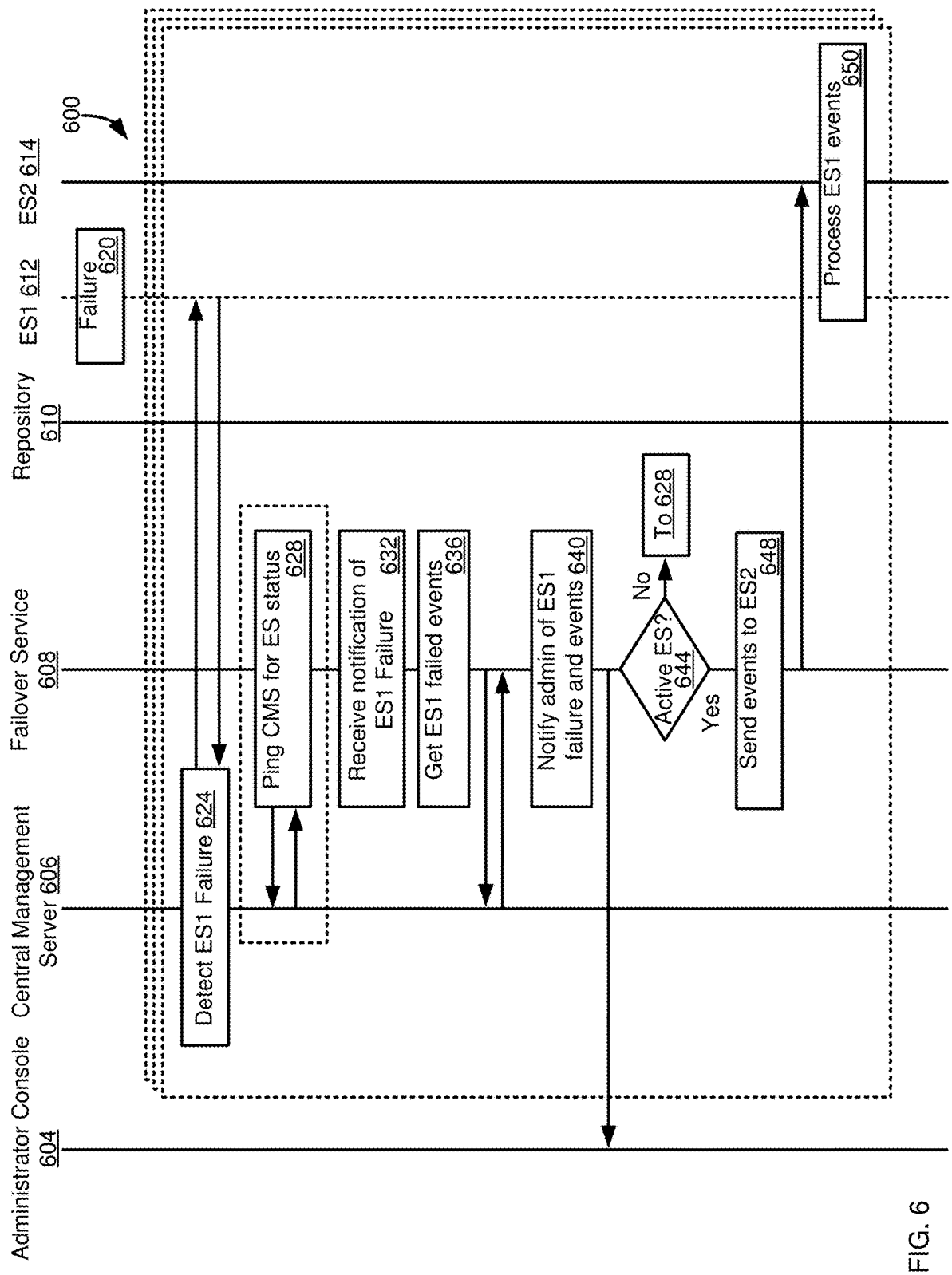
FIG. 6 is a diagram illustrating a process for processing events at a second event server that were registered for processing by a first event server, where registry records for the events are not updated to indicate that they will be processed by the second event server.

Example 7—Example Process for Processing Events Registered with a First Event Server Using a Second Event Server, without Remapping the Events FIG. 6 is a diagram of a process 600 for detecting and handling failure of an event server. The process 600 can be carried out in the computing environment 200 of FIG. 2, and the event can be an event 212. The process 600 can represent actions taken after the process 400 of FIG. 4 has been carried out for one or more events. The process 600 can have some similarities to the process 500. However, in the process 600, events for a failed event server are not remapped or registered to a different event server. Instead, the events are forwarded to the second event server for processing, but remain mapped to the failed event server, so that they can continue to be processed by such event server when it regains operational status.

The process 600 is carried out using an administrator console 604, a central management server 606, a failover service 608, a repository 610, and first and second event servers 612, 614. The components 604-614 can be analogous to the similarly titled components 504-514 of FIG. 5. The process 600 includes steps 620-644, which can be analogous to the similarly numbered steps 520-544 of the process 500 of FIG. 5.

At 648, if it is determined that the second event server 614 is active and available to process events of the first event server 612, the failover service 608 can send, or cause to be sent, such events to the second event server. For example, the failover service 608 can call an interface of the second event server 614, and can provide identifiers for the first event server's events as arguments. The second event server 614 can then process the events at 650.

Since the failover service 608 continues to ping the central management server 606, as long as the first event server 612 is unavailable, additional failed or unprocessed events will be sent to be processed by the second event server 614.

Figure 7:
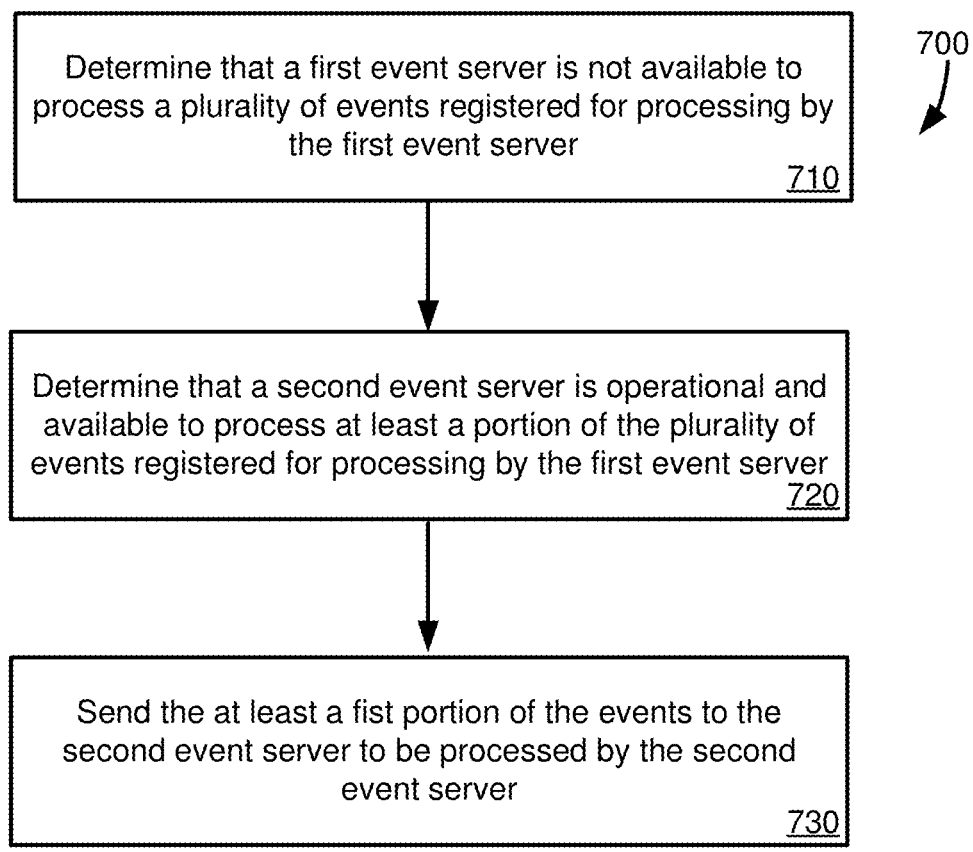
FIG. 7 is a flowchart of an example method of using a second event server to process events registered for processing by a first event server.

Example 8—Example Process for Processing Events Registered with a First Event Server Using a Second Event Server FIG. 7 is a flowchart of a method 700 of processing events registered with a first event server with a second event server. The method 700 can be carried out in the computing environment 200 of FIG. 2, and can represent activities carried out in the processes 500 or 600 of FIGS. 5 and 6.

At 710, it is determined (such as by an event failover service) that a first event server is not available to process a plurality of events registered for processing by the first event server. It is determined at 720 that a second event server is operational for the computing system and is available to process at least a first portion of the plurality of events registered for processing by the first event sever. At 730, the at least a first portion of the plurality of events are sent to the second event server to be processed by the second event server.

Example 9—Computing Systems

Figure 8:
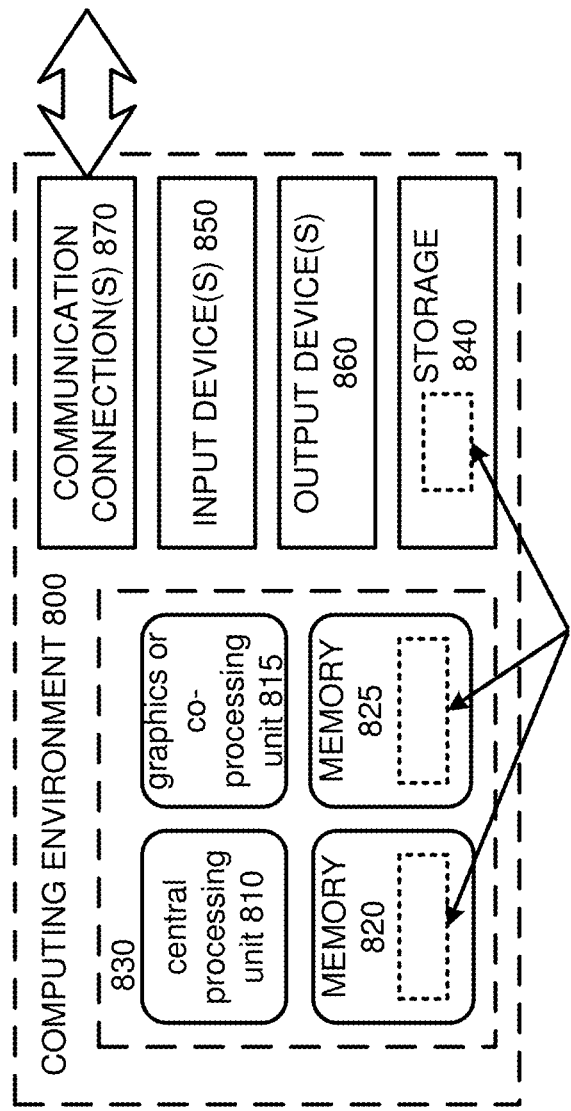
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the architecture 200 of FIG. 2, including as further described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 9:
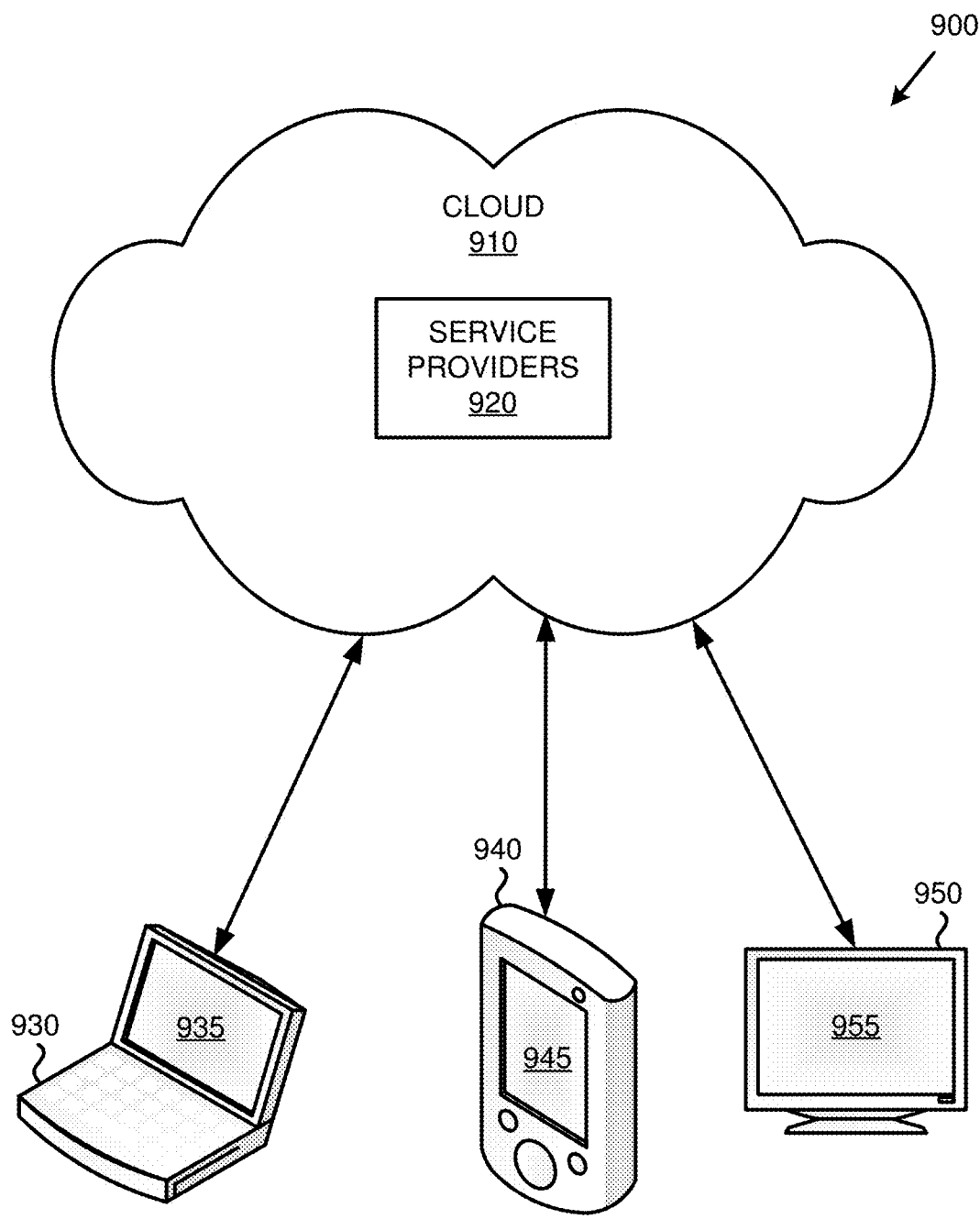
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more hardware processing units coupled to the memory; and
   one or more computer-readable storage media storing computer-executable instructions that, when executed, cause the computing system to perform operations comprising:
      determining that a first event server is not available to process a plurality of events registered for processing by the first event server;
      determining that a second event server is operational for the computing system and is available to process at least a first portion of the plurality of events registered for processing by the first event server; and
      sending the at least a first portion of the plurality of events to the second event server to be processed by the second event server;
      wherein the plurality of events are implemented as software objects comprising a plurality of data elements and wherein the sending the at least a first portion of the plurality of events comprises selecting events of the plurality of events having a data element with a value indicating that a respective event of the at least a first portion of the plurality of events should be processed by the first event server.

2. The computing system of claim 1, the operations further comprising:
   determining the at least a first portion of the plurality of events, the determining comprising querying a database having at least one table storing a plurality of fields for events of the plurality of events, the plurality of fields comprising a first field identifying an event server to which an event of the plurality of events is registered and a second field identifying an event status.

3. The computing system of claim 2, the operations further comprising:
   updating values of the first field for rows corresponding to the at least a first portion of the plurality of events from identifying the first event server to identifying the second event server.

4. The computing system of claim 1, wherein the sending the at least a first portion of the plurality of events to the second event server comprises updating values of the data element for the at least a first portion of the plurality of events from the first event server to the second event server.

5. The computing system of claim 1, the operations further comprising:
   sending a notification that the first event server is not operational.

6. The computing system of claim 1, the operations further comprising:
   transmitting a notification that the at least a first portion of the plurality of events have been sent to the second event server.

7. The computing system of claim 1, the operations further comprising:
   contacting a central server to determine an operational status of the first event server;
   wherein the determining that the first event server is not available to process a plurality of events registered for processing by the first event server is carried in response to a message from the central server indicating that the first event server is not operational.

8. The computing system of claim 1, the operations further comprising:
   with the second event server, determining that a first event of the at least a first portion of the plurality of events has occurred;
   with the second event server, sending a notification to a central server that the first event has occurred;
   with the central server, determining one or more data objects that are triggered by the first event; and
   with the central server, triggering processing of the one or more data objects.

9. The computing system of claim 1, wherein the determining that the first event server is not available to process the plurality of events is a first determination made at a first time and the determining that the second event server is operational is a first determination and the determining that a second event server is operational for the computing system is a second determination, the operations further comprising:
   making a third determination at a second time, the second time being after the first time, that the first event server is not available to process the plurality of events registered for processing by the first event server;
   making a fourth determination that the second event server is operational for the computing system and is available to process at least a second portion of the plurality of events registered for processing by the first event server; and
   sending the at least a second portion of the plurality events to the second event server to be processed by the second event server.

10. The computing system of claim 9, the operations further comprising:
    determining that the at least a second portion of the plurality of events have a status identifier identifying them as pending events.

11. The computing system of claim 10, the operations further comprising:
    for at least one event of the at least a first portion of the plurality of events, changing a value of the status identifier from a pending status to another status after the at least one event has been processed by the second event server.

12. The computing system of claim 9, the operations further comprising:
    selecting the at least the second portion of the plurality of events by querying a database for events of the plurality of events assigned to the first event server for processing and having a status field with a value indicating that an event of the events is a pending event.

13. A method, implemented in a computing system comprising a memory and one or more hardware processors coupled to the memory, comprising:

determining that a first event server is not available to process a plurality of events registered for processing by the first event server;

determining that a second event server is operational for the computing system and is available to process at least a first portion of the plurality of events registered for processing by the first event server;

sending the at least a first portion of the plurality of events to the second event server to be processed by the second event server;

with the second event server, determining that a first event of the at least a first portion of the plurality of events has occurred;

with the second event server, sending a notification to a central server that the first event has occurred;

with the central server, determining one or more data objects that are triggered by the first event; and with the central server, triggering processing of the one or more data objects.

14. The method of claim 13, further comprising:

determining the at least a first portion of the plurality of events, the determining comprising querying a database having at least one table storing a plurality of fields for events of the plurality of events, the plurality of fields comprising a first field identifying an event server to which an event is registered and a second field identifying an event status.

15. The method of claim 14, further comprising:

updating values of the first field for rows corresponding to the at least a first portion of the plurality of events from identifying the first event server to identifying the second event server.

16. The method of claim 15, wherein the plurality of events are implemented as software objects comprising a plurality of data elements and wherein the sending the at least a first portion of the plurality of events comprises selecting events of the plurality of events having a data element with a value indicating that the event should be processed by the first event server and the sending comprises updating values of the data element for the at least a first portion of the plurality of events from the first event server to the second event server.

17. The method of claim 13, wherein the determining that the first event server is not available to process the plurality of events is a first determination made at a first time and the determining that the second event server is operational is a first determination, the method further comprising:

making a second determination at a second time, the second time being after the first time, that the first event server is not available to process the plurality of events registered for processing by the first event server;

making a second determination that the second event server is operational for the computing system and is available to process at least a second portion of the plurality of events registered for processing by the first event server; and sending the at least a second portion of the plurality events to the second event server to be processed by the second event server.

18. One or more non-transitory computer storage media comprising:

computer-executable instructions that, when executed by a computing system comprising at least one hardware processor and at least one memory coupled to the at least one hardware processor, cause the computing system to, at a first time, make a first determination that a first event server is not available to process a plurality of events registered for processing by the first event server;

computer-executable instructions that, when executed by the computing system, cause the computing system to make a second determination that a second event server is operational for the computing system and is available to process at least a first portion of the plurality of events registered for processing by the first event server;

computer-executable instructions that, when executed by the computing system, at least partially in response to the first determination, cause the computing system to send the at least a first portion of the plurality of events to the second event server to be processed by the second event server;

computer-executable instructions that, when executed by the computing system, cause the computing system to, at a second time, the second time being after the first time, make a third determination that the first event server is not available to process the plurality of events registered for processing by the first event server;

computer-executable instructions that, when executed by the computing system, cause the computing system to make a fourth determination that the second event server is operational for the computing system and is available to process at least a second portion of the plurality of events registered for processing by the first event server; and computer-executable instructions that, when executed by the computing system, cause the computing system to, at least partially in response to the third determination, send the at least a second portion of the plurality events to the second event server to be processed by the second event server.

19. The one or more non-transitory computer media of claim 18, further comprising:

computer-executable instructions that, when executed by the computing system, cause the computing system to determine the at least a first portion of the plurality of events, the determining comprising querying a database having at least one table storing a plurality of fields for events of the plurality of events, the plurality of fields comprising a first field identifying an event server to which an event is registered and a second field identifying an event status.

20. The one or more non-transitory computer media of claim 18, wherein the plurality of events are implemented as software objects comprising a plurality of data elements and wherein the sending the at least a first portion of events comprises selecting events of the plurality of events having a data element with a value indicating that the event should be processed by the first event server.

* * * * *